United States Patent
Kobayashi

(10) Patent No.: US 12,078,241 B2
(45) Date of Patent: Sep. 3, 2024

(54) METHOD FOR LUBRICATING STRAIN WAVE GEARING

(71) Applicant: HARMONIC DRIVE SYSTEMS INC., Tokyo (JP)

(72) Inventor: Masaru Kobayashi, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 17/921,215

(22) PCT Filed: Aug. 4, 2021

(86) PCT No.: PCT/JP2021/029022
§ 371 (c)(1),
(2) Date: Oct. 25, 2022

(87) PCT Pub. No.: WO2023/012949
PCT Pub. Date: Feb. 9, 2023

(65) Prior Publication Data
US 2024/0218926 A1 Jul. 4, 2024

(51) Int. Cl.
*F16H 57/04* (2010.01)
*F16H 49/00* (2006.01)

(52) U.S. Cl.
CPC ......... *F16H 57/048* (2013.01); *F16H 49/001* (2013.01); *F16H 57/041* (2013.01)

(58) Field of Classification Search
CPC .... F16H 49/001; F16H 57/041; F16H 57/048; C10M 2201/066; C10M 2201/065
See application file for complete search history.

(56) References Cited

U.S. PATENT DOCUMENTS 10,837,543 B2 * 11/2020 Kusumoto .......... F16H 57/0464
2017/0254404 A1 9/2017 Kobayashi
(Continued)

FOREIGN PATENT DOCUMENTS

| JP | H07205899 A | 8/1995 |
|----|-------------|--------|
| JP | 2008031254 A | 2/2008 |

(Continued)

OTHER PUBLICATIONS

International Search Report (PCT/ISA/210) and Written Opinion (PCT/ISA/237) mailed on Oct. 5, 2021, by the Japan Patent Office as the International Searching Authority for International Application No. PCT/JP2021/029022. (8 pages).

*Primary Examiner* — Jake Cook
(74) *Attorney, Agent, or Firm* — BUCHANAN INGERSOLL & ROONEY PC

(57) ABSTRACT

A strain wave gearing is lubricated by a non-hydrophobized powder enclosed in an internal space until the strain wave gearing is fully broken in, and the non-hydrophobized powder is transferred to contact surfaces of contact parts to form a lubricating film. During operation under load, the strain wave gearing is lubricated by a hydrophobized powder enclosed in the internal space instead of the non-hydrophobized powder. Each of the powders used is a powder of an ionic crystalline compound (MoS2, WS2, etc.) having a layered crystal structure. By lubricating the strain wave gearing with the hydrophobized powder during operation under load, any temporary decrease in efficiency at the start of operation is minimized and stable operation of the strain wave gearing can be maintained.

8 Claims, 2 Drawing Sheets

(56) References Cited

U.S. PATENT DOCUMENTS

2017/0370457 A1 12/2017 Kobayashi
2019/0346034 A1* 11/2019 Noda .................. F16H 57/0464

FOREIGN PATENT DOCUMENTS

| WO | 2016084235 A1 | 6/2016 |
| WO | 2016113847 A1 | 7/2016 |

* cited by examiner

METHOD FOR LUBRICATING STRAIN WAVE GEARING

TECHNICAL FIELD

The present invention relates to a strain wave gearing, and particularly relates to a method for lubricating a strain wave gearing using a powder of an ionic crystalline compound having a layered crystal structure as a solid lubricant powder.

BACKGROUND ART

In Patent Documents 1 and 2, the present inventor proposes a method for lubricating a strain wave gearing using a solid lubricant powder. In Patent Document 1, the strain wave gearing is lubricated using a fine powder of an ionic crystalline compound having a layered crystal structure. During operation of the strain wave gearing, the fine powder is crushed between contact surfaces to be lubricated, transferred to both contact surfaces to form a thin lubricating film, thinly rolled, and further broken down into a form that readily enters between the contact surfaces. Lubrication is maintained by the shape-changed fine powder and the thin lubricating film formed on the contact surfaces. Because the transferred thin lubricating film and the rolled and broken down fine powder have no viscosity, there is no viscous resistance loss, and high-efficiency operation in a low-load range and a high-speed range can be realized. In Patent Document 2, a mechanism for efficiently guiding fine powder of a solid lubricant to a part to be lubricated is incorporated within a strain wave gearing.

PRIOR ART LITERATURE

Patent Documents

[Patent Document 1] WO 2016/084235 A1
[Patent Document 2] WO 2016/113847 A1

DISCLOSURE OF THE INVENTION

Problems to be Solved by the Invention

Owing to loss torque produced when a fine powder of a solid lubricant packed in an externally toothed gear is introduced into a gap between contact surfaces by cleaving force, thinly rolled, and further broken down, the strain wave gearing may experience a temporary decrease in efficiency. In particular, when a fine powder of an ionic crystalline compound ($MOS_2$, $WS_2$, etc.) having a layered crystal structure is used, moisture in the atmosphere forms in rows on the surfaces of the layered crystals due to hydrogen bonding, and friction increases. In addition, the fine powder becomes more cohesive, and particle aggregations increase in size. Thus, the fine powder packed in the externally toothed gear is affected by the moisture in the atmosphere and crushed between the contact surfaces during operation of the strain wave gearing, efficiency decreases when a large amount of powder is introduced into a fine gap inside a wave generator that rotates at a particularly high speed, and stable operation of the strain wave gearing is hindered.

An object of the present invention is to provide a method for lubricating a strain wave gearing which minimizes any temporary decrease in efficiency due to powder of an ionic crystalline compound having a layered crystal structure used as a solid lubricant powder, and enables operation to be performed stably at high efficiency.

Means Used to Solve the Above-Mentioned Problems

In the method for lubricating a strain wave gearing of the present invention, contact surfaces to be lubricated are lubricated using a non-hydrophobized powder of an ionic crystalline compound having a layered crystal structure until the strain wave gearing is fully broken in (aged), and the powder of the ionic crystalline compound is transferred to the contact surfaces to form a strong lubricating film on the contact surfaces. A hydrophobized powder of the ionic crystalline compound having a layered crystal structure is then enclosed or packed in an internal space of the strain wave gearing. When the strain wave gearing is operated under load, the contact surfaces are kept in a lubricated state by the lubricating film formed on the contact surfaces and the hydrophobized powder of the ionic crystalline compound having a layered crystal structure.

The ionic crystalline compound having a layered crystal structure used herein is molybdenum disulfide, tungsten disulfide, etc. The hydrophobized powder of the ionic crystalline compound, which has a layered crystal structure enclosed or filled in the internal space of the strain wave gearing after breaking in (aging), is obtained by, for example, using a cationic surfactant such as alkylamine acetate to hydrophobize a fine powder having an average particle size of 5 μm or less measured by laser analysis/scattering, and pulverizing the powder again.

Effects of the Invention

By using a hydrophobized powder as a powder of an ionic crystalline compound enclosed or packed in an internal space of a strain wave gearing, it is possible to reduce the extent to which the efficiency of the strain wave gearing is reduced, minimize the frequency with which such an efficiency decrease occurs, and maintain a stable high-efficiency state over a long period of time. In addition, little heat is generated because torque loss is small.

MODE FOR CARRYING OUT THE INVENTION

An embodiment of a method for lubricating a strain wave gearing of the present invention is described below with reference to the drawings. In the embodiment below, the present invention is applied to a cup-profile strain wave gearing comprising a cup-shaped externally toothed gear, but the present invention can be similarly applied to strain wave gearings other than a cup-profile strain wave gearing. For example, the present invention can be applied to a top-hat-profile strain wave gearing comprising a top-hat-shaped externally toothed gear, and a flat-profile strain wave gearing comprising a cylindrical externally toothed gear and two internally toothed gears.

Figure 1:
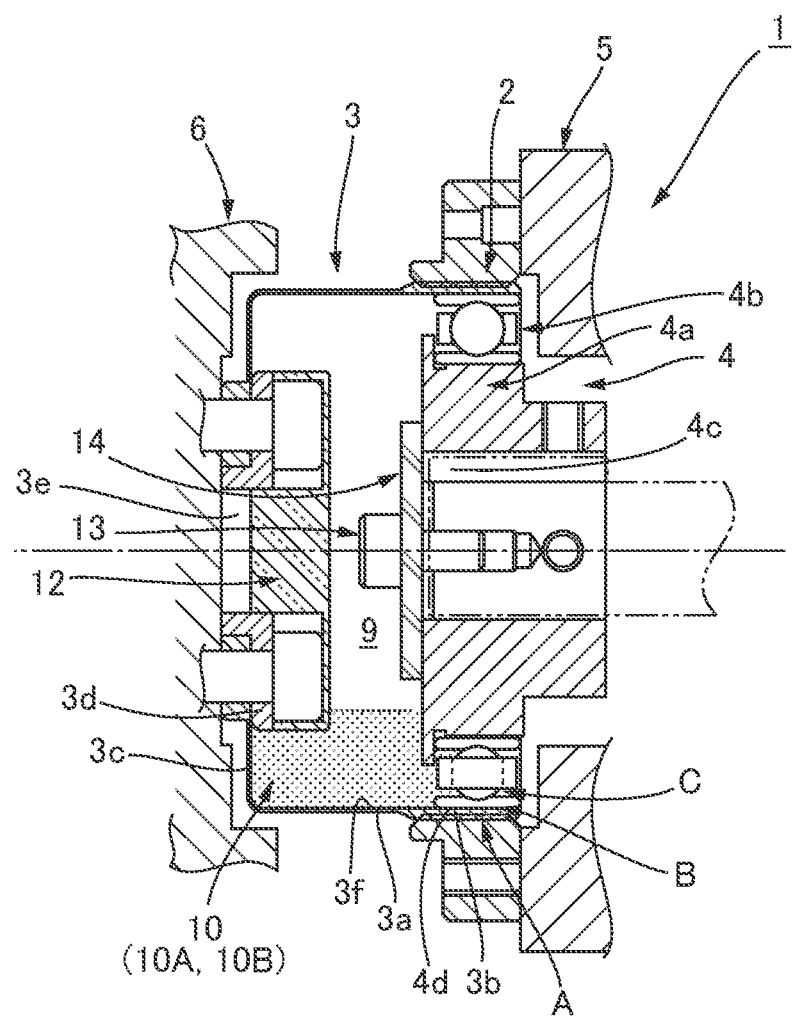
FIG. 1 is a schematic longitudinal cross-sectional view of an example of a strain wave gearing.

FIG. 1 is a schematic longitudinal cross-sectional view of an example of a cup-profile strain wave gearing. A cup-profile strain wave gearing 1 (referred to hereinafter simply as "strain wave gearing 1") comprises an annular rigid internally toothed gear 2, a cup-shaped flexible externally toothed gear 3, and an ellipsoidally contoured wave generator 4. The externally toothed gear 3 is disposed coaxially inside the internally toothed gear 2. The wave generator 4 is fitted inside the externally toothed gear 3. The externally toothed gear 3, which is caused to flex into an ellipsoidal shape by the wave generator 4, meshes with the internally toothed gear 2 at the positions of both ends of the long axis of the ellipsoid shape.

The externally toothed gear 3 is cup-shaped, and external teeth 3*b* are formed in an external peripheral surface portion on the same side as an open end of a radially flexible cylindrical barrel part 3*a*. A diaphragm 3*c* that extends radially inward is also formed from the end on the opposite side of the cylindrical barrel part 3*a*. An annular rigid boss 3*d* is formed in an internal peripheral edge of the diaphragm 3*c*. The wave generator 4 comprises a rigid wave plug 4*a* and a wave bearing 4*b* (wave generator bearing) fitted on an ellipsoidally contoured external peripheral surface of the wave plug. The wave generator 4 is fitted to the inner side of the portion of the cylindrical barrel part 3*a* where the external teeth 3*b* are formed in the externally toothed gear 3.

A solid lubricant powder 10 is enclosed or packed in an internal space 9 formed between the cylindrical barrel part 3*a* and boss 3*d* of the externally toothed gear 3, and the wave generator 4 fitted in the open-end side of the externally toothed gear 3. As described hereinafter, a non-hydrophobized powder 10A of an ionic crystalline compound having a layered crystal structure (referred to hereinafter as the "non-hydrophobized powder 10A") and a hydrophobized powder 10B of an ionic crystalline compound (referred to hereinafter as the "hydrophobized powder 10B") are used as the solid lubricant powder 10. A central opening part 3*e* of the boss 3*d* is closed off by a cap 12, and a central opening part 4*c* of the wave generator 4 is closed off by a plain washer 14 and a head of a bolt 13 used to secure an input shaft shown in the drawing in imaginary lines. The solid lubricant powder 10 is prevented from leaking out through these central opening parts 3*e*, 4*c*.

The major parts to be lubricated in the strain wave gearing 1 are a contact part (teeth part) A between the internally toothed gear 2 and the externally toothed gear 3, a contact part B between an inner peripheral surface 3*f* of the cylindrical barrel part 3*a* of the externally toothed gear 3 and an external peripheral surface 4*d* of the wave generator 4, and a contact part C inside the wave generator 4. The contact part C inside the wave generator 4 is a contact portion between the wave plug 4*a* and the wave bearing 4*b*, a contact portion between constituent components (inner race, outer race, and balls) of the wave bearing 4*b*, etc. The contact surfaces (inner peripheral surface 3*f* and external peripheral surface 4*d*) of the contact part B and the contact surfaces in the contact part C inside the wave generator 4 communicate with the internal space 9. The contact surfaces of the contact parts B, C are lubricated by the solid lubricant powder 10 enclosed or packed in the internal space 9. The contact part (toothed part) A is lubricated by common oil lubrication or grease lubrication.

When the strain wave gearing 1 is used as a reducer, the wave generator 4 is caused to rotate at high speed by a motor (not shown), etc. For example, the internally toothed gear 2 is secured to a casing 5 and the externally toothed gear 3 rotates at a reduced speed. The reduced rotation is transferred to a rotation output member 6 coaxially linked to the rigid boss 3*d* formed on the externally toothed gear 3.

According to experiments performed by the present inventors et al., it was confirmed that in order to obtain a predetermined lubricating effect and realize smooth rotation of the wave generator 4, it is preferable to use a soft fine powder having an average particle size of 15 μm or less and a Mohs hardness of 1.5 or less as the solid lubricant powder 10.

An ionic crystalline compound having a layered crystal structure, e.g., molybdenum disulfide, tungsten disulfide, graphite, boron nitride, etc., can be used as the solid lubricant powder 10. Two or more of these solid lubricant powders can also be used in combination. In particular, molybdenum disulfide and tungsten disulfide can be used.

Figure 2:
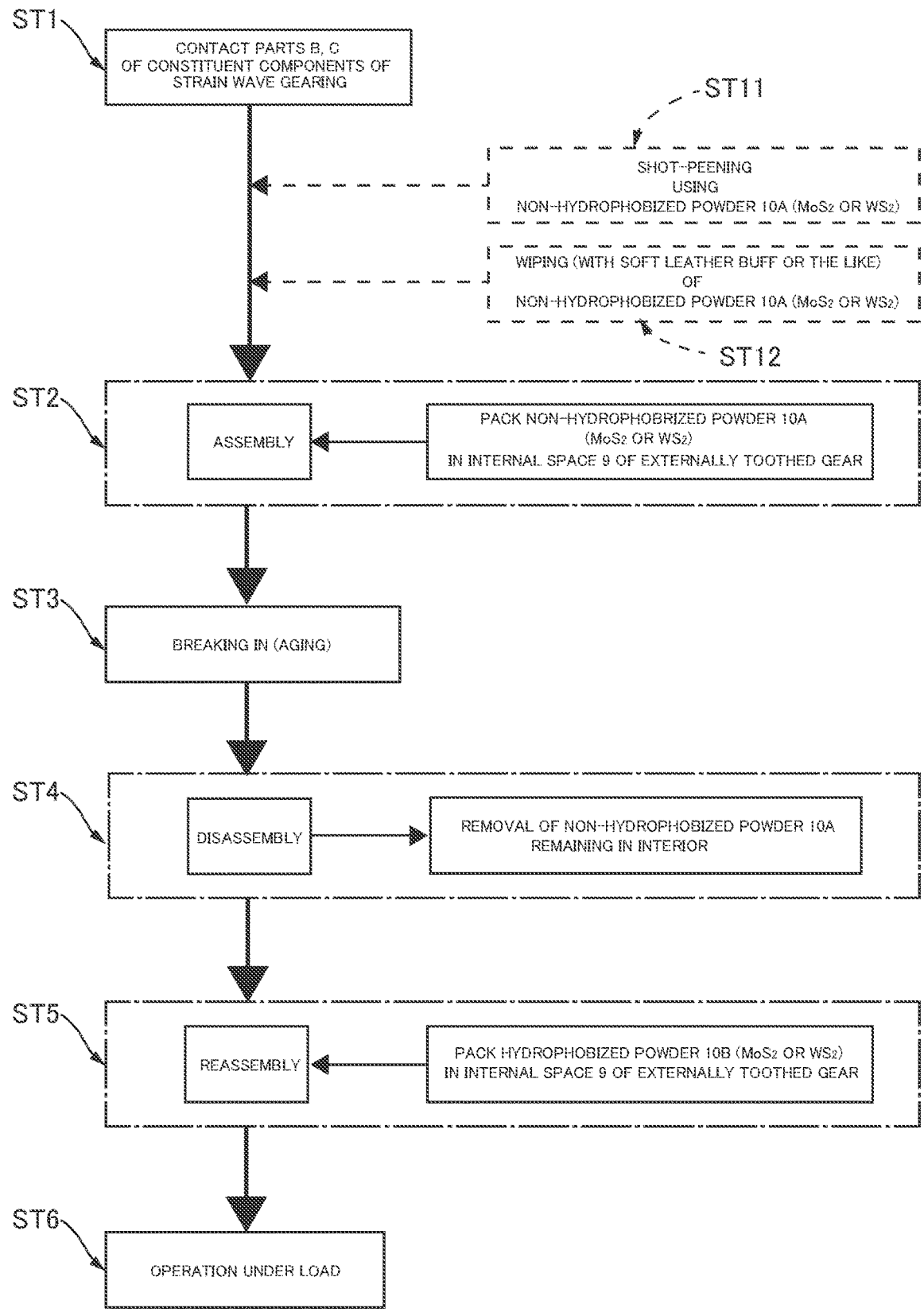
FIG. 2 is a schematic flowchart of an example of a method for lubricating a strain wave gearing to which the present invention is applied.

FIG. 2 is a schematic flowchart of an example of a method for lubricating the strain wave gearing 1 to which the present invention is applied. In the lubrication method of the present example, the contact parts B, C are lubricated using the non-hydrophobized powder 10A as the solid lubricant powder 10 until the strain wave gearing 1 is fully broken in (aged), and the contact parts B, C are lubricated using the hydrophobized powder 10B as the solid lubricant powder 10 during subsequent operation under load.

The following description references FIG. 2. First, the externally toothed gear 3 and the wave generator 4, which are constituent components constituting the contact parts B, C in the strain wave gearing 1, are prepared (ST1), and the surfaces of these gears are shot-peened using the non-hydrophobized powder 10A (non-hydrophobized molybdenum disulfide ($MoS_2$) powder or non-hydrophobized tungsten disulfide ($WS_2$) powder) (ST11). As a result, the non-hydrophobized powder 10A is transferred to the surface portions serving as contact surfaces that constitute the contact parts B, C in the constituent components, forming a lubricating film. Instead of or in combination with shot peening, the non-hydrophobized powder 10A may be transferred to the contact surfaces constituting the contact parts B, C to form a lubricating film by wiping the non-hydrophobized powder 10A onto the surfaces of the constituent components using a soft leather buff or the like (ST12). These steps (ST11, ST12) can also be omitted.

Next, in a step of assembling the constituent components of the strain wave gearing 1, molybdenum disulfide ($MoS_2$) powder or tungsten disulfide ($WS_2$) powder is enclosed or packed as non-hydrophobized powder 10A in the internal space 9 of the cup-shaped externally toothed gear 3 (ST2).

With the non-hydrophobized powder 10A having been enclosed or packed in the internal space 9, the strain wave gearing 1 is broken in (aged) (ST3). When the strain wave gearing 1 is being broken in, the non-hydrophobized powder 10A enclosed or filled in the internal space 9 is crushed between the contact surfaces of the contact parts B, C and transferred to these contact surfaces to form a strong and thin lubricating film. In addition, the non-hydrophobized powder 10A is thinly rolled and further broken down into a fine powder shaped so as to easily enter between the contact surfaces.

Lubrication of the contact parts B, C is maintained by the fine powder of the non-hydrophobized powder 10A that has thus changed shape and the thin lubricating film formed on the contact surfaces of the contact parts B, C. In addition, there is no viscous resistance loss because the thin lubricating film transferred to the contact surfaces and the rolled and broken down non-hydrophobized powder 10A have no viscosity.

The strain wave gearing 1 is preferably broken in (aged) under low load in order to obtain a lubricating effect and smooth movement from the start of operation. In addition, the non-hydrophobized powder 10A enclosed or packed in the internal space 9 of the externally toothed gear 3 may be rolled in advance into thin flakes. This has the effect of making it possible to realize smooth rotation of the wave generator 4 particularly in the initial stage of operation.

After having been fully broken in, the strain wave gearing 1 is temporarily disassembled. After disassembly, the non-hydrophobized powder 10A remaining in the internal space 9 of the cup-shaped externally toothed gear 3 is removed and recovered (ST4).

The constituent components of the strain wave gearing 1 are then reassembled. In the reassembly step, hydrophobized molybdenum disulfide powder or hydrophobized tungsten disulfide powder, which are hydrophobized powders 10B, is enclosed or packed in the internal space 9 of the externally toothed gear 3 instead of the non-hydrophobized powder 10A (ST5). For example, molybdenum disulfide powder is used as both the non-hydrophobized powder 10A and the hydrophobized powder 10B. Alternatively, different types of solid lubricant powders can be prepared as the solid lubricant powder 10, one powder can be used untreated as the non-hydrophobized powder 10A, and the other powder can be subjected to hydrophobization treatment and used as the hydrophobized powder 10B.

In the hydrophobization treatment of the solid lubricant powder 10 (powder of an ionic crystalline compound having a layered crystal structure), a cationic surfactant, e.g., alkylamine acetate or the like is diluted with a solvent at a ratio of about 1:100-1:200. The solid lubricant powder 10, having an average particle size of 5 μm or less, is introduced into the diluted liquid and stirred to become hydrophobic. As a result, the hydrophobized powder 10B is obtained. C10-15 alkylamine acetate is preferred as the cationic surfactant. In addition, the solid lubricant powder 10 and the cationic surfactant are preferably mixed at a molar ratio of 1:0.06-0.07.

In the above manner, a strain wave gearing 1 is obtained in which the hydrophobized powder 10B is enclosed or packed in the internal space 9. In the under-load operation state (ST6) of the strain wave gearing 1, the lubricated state of the contact parts B, C is maintained by the hydrophobized powder 10B and the lubricating film formed on the contact surfaces during breaking in (ST3) and the preceding steps (ST11, ST12).

Thus, hydrophobized powder 10B is used as the solid lubricant powder 10 (powder of an ionic crystalline layered compound) enclosed or packed in the internal space 9 of the strain wave gearing 1 during operation under load. It is possible for the extent to which the efficiency of the strain wave gearing 1 decreases to be reduced and the frequency with which such an efficiency decrease occurs to be minimized to a greater extent than when using untreated non-hydrophobized powder 10A. Consequently, a stable, highly efficient state of the strain wave gearing 1 can be maintained over a long period of time. In addition, heat generation can also be minimized because torque loss is reduced.

The invention claimed is:

1. A method for lubricating a strain wave gearing using a powder of an ionic crystalline compound having a layered crystal structure, said method characterized in that:
    carrying out braking-in operation of the strain wave gearing using non-hydrophobized powder having been enclosed or packed as the powder of the ionic crystalline compound in an internal space of the strain wave gearing, the internal space being communicated with contact surfaces to be lubricated;
    transferring the non-hydrophobized powder to the contact surfaces to form a lubricating film on the contact surfaces by the breaking-in operation;
    after the breaking-in operation, removing any non-hydrophobized powder remaining in the internal space and enclosing or packing a hydrophobized powder in the internal space as a powder of the ionic crystalline compound; and
    during operation under load, maintaining a lubricated state of the contact surfaces by the lubricating film and the hydrophobized powder enclosed or packed in the internal space.

2. The method for lubricating a strain wave gearing according to claim 1, wherein
    the ionic crystalline compound is molybdenum disulfide or tungsten disulfide.

3. The method for lubricating a strain wave gearing according to claim 2, wherein
    the non-hydrophobized powder has an average particle size of 15 μm or less and a Mohs hardness of 1.5 or less.

4. The method for lubricating a strain wave gearing according to claim 3, wherein
    the hydrophobized powder is obtained by using a cationic surfactant to hydrophobize a powder of the ionic crystalline compound having an average particle size of 5 μm or less.

5. A strain wave gearing comprising:
    an internal space communicating with contact surfaces to be lubricated;
    a solid lubricant powder enclosed or packed in the internal space; and
    a lubricating film formed on the contact surfaces,
    the solid lubricant powder being a hydrophobized powder of an ionic crystalline compound having a layered crystal structure, and
    the lubricating film being a film formed by transferring a non-hydrophobized powder of an ionic crystalline compound having a layered crystal structure onto the contact surfaces.

6. The strain wave gearing according to claim 5, wherein
    the ionic crystalline compound is molybdenum disulfide or tungsten disulfide.

7. The strain wave gearing according to claim 5, wherein
    the solid lubricant powder is obtained by using a cationic surfactant to hydrophobize a powder of the ionic crystalline compound having an average particle size of 5 μm or less.

8. The strain wave gearing according to claim 5, comprising:
    a rigid internally toothed gear;
    a flexible externally toothed gear disposed inside the internally toothed gear; and
    a wave generator that is fitted inside the externally toothed gear, that causes the externally toothed gear to flex into a noncircular shape and mesh with the internally toothed gear, and that causes the meshing positions between the two gears to move in a circumferential direction,
    the internal space being a space surrounded by the externally toothed gear and the wave generator, and
    the contact surfaces being a contact surface between the externally toothed gear and the wave generator and a contact surface inside the wave generator.

* * * * *